INVENTORS
John D. Settles
Martin Usab
Fred K. Wyckoff
BY
Bacon & Thomas
ATTORNEYS INVENTORS
John D. Settles
Martin Usab
Fred K. Wyckoff
BY
Bacon & Thomas
ATTORNEYS

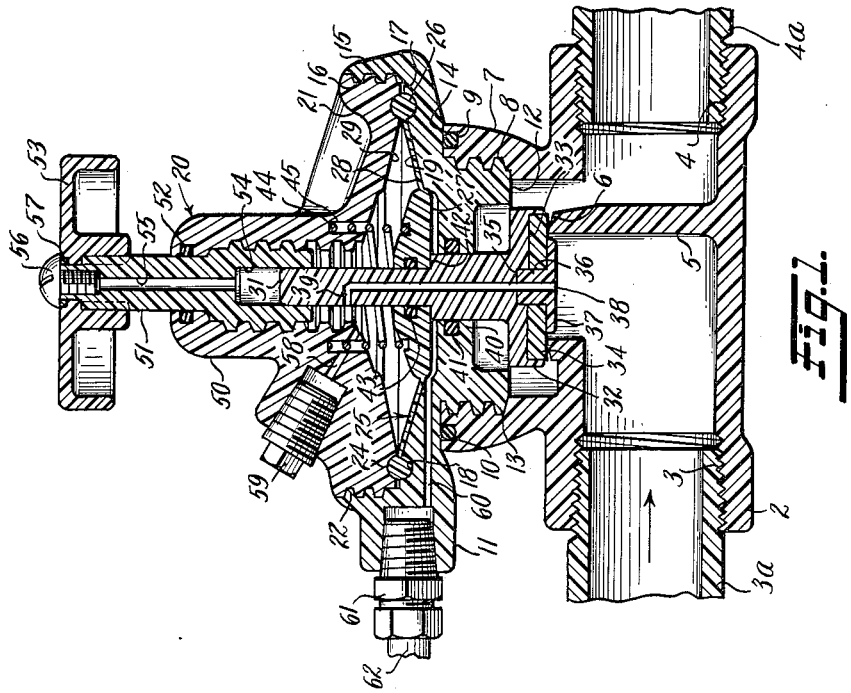

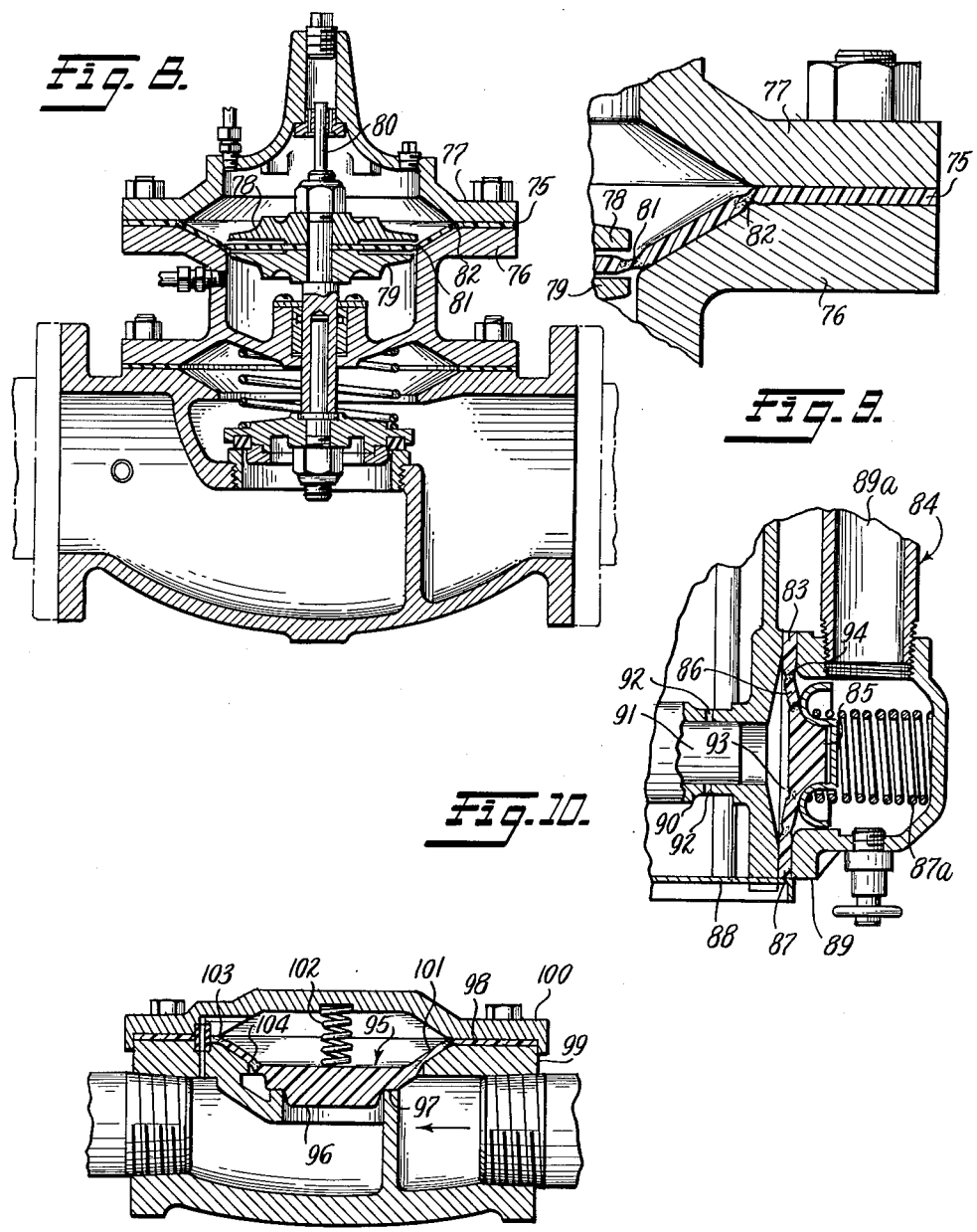

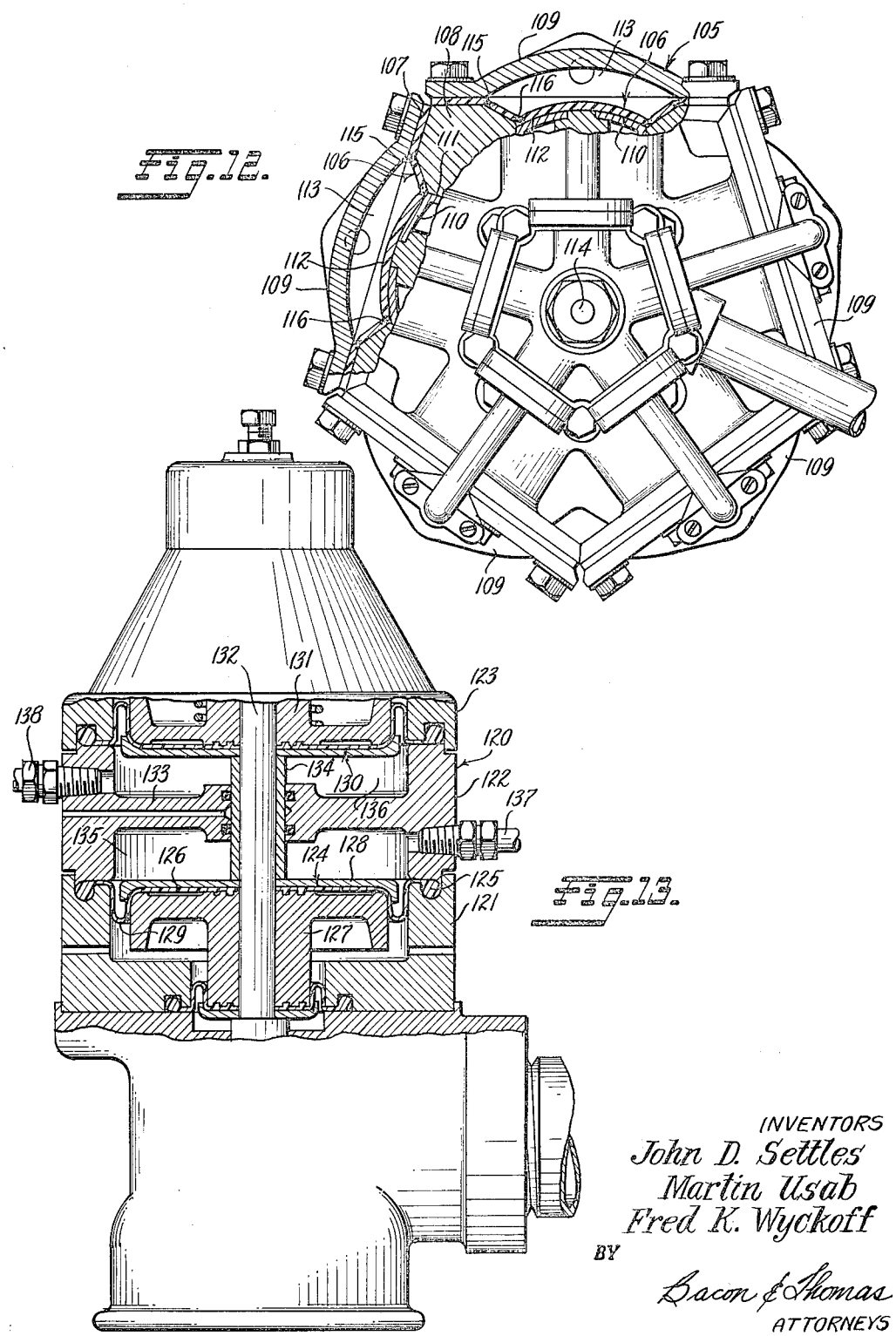

United States Patent Office 3,218,378
Patented Nov. 16, 1965

3,218,378
METHOD OF PRETREATING A POLYPROPYLENE DIAPHRAGM TO RENDER IT MORE FLEXIBLE
John D. Settles, Garden Grove, Martin Usab, Costa Mesa, and Fred K. Wyckoff, Newport Beach, Calif., assignors to Donald G. Griswold, Newport Beach, Calif.
Filed Apr. 18, 1962, Ser. No. 188,489
2 Claims. (Cl. 264—89)

The present invention relates to a novel method of preconditioning plastic diaphragm material to render the same usable in certain valves, pumps, fluid motors and other devices wherein they are expected to undergo repeated cycles of flexing action over long periods of time without failure.

As is well known, molded or sheet polypropylene plastic resin material of any appreciable thickness is hard or stiff and lacks pliability, which renders it unsuited for many uses. A specific aspect of the present invention is to overcome this inherent characteristic of polypropylene material by subjecting the same to special treatment that will impart flexibility to one or more areas thereof wherein pliability is essential to enable the material to be used for selected purposes. At the same time, the rigid characteristic of polypropylene may be retained by appropriate design, whereby a given article, such as a diaphragm, can be constructed so that it will embody flexible as well as relatively rigid portions.

The foregoing factors make it possible to design a polypropylene diaphragm so that the customary diaphragm supporting washers employed at the opposite sides of conventional diaphragms can be eliminated, thereby simplifying construction and reducing costs.

Another advantage is that various metallic elements may be completely or partially embedded in the diaphragm during a molding operation, whereby parts that might otherwise be required to be fabricated separately and assembled with the diaphragm can be incorporated into a single molded element, resulting in savings in cost of manufacture and assembly, and further enhancing the usefulness of this type of diaphragm.

Reverting to the special treatment to be given to diaphragms made in accordance with the present invention, it has long been known that polypropylene material, when made of a thickness such that it has some rigidity, is brittle and will snap or break if a bending force is suddenly applied thereto; whereas, it was discovered that if the same material is slowly and gently bent back and forth several times under extreme bending movements, the molecules in the material at the zones of greatest stress or flexure will orient themselves to accommodate the flexing, with the result that the material thereafter can be flexed an infinite number of times without causing breaking or rupturing of the material at the zones of flexure, as will be pointed out in greater detail hereinafter.

The principal object of the present invention is to provide a pretreating process for diaphragm material and diaphragm structures that will provide longer life together with improved flexibility while affording greater resistance to high temperatures, corrosive chemicals, solvents and fatigue than is afforded by previously known diaphragms and materials.

Another object is to provide a method of conditioning or pretreating plastic diaphragm material so that it will acquire increased flexibility at its zones of flexure and which can be manipulated through an amazing number of complete flexing cycles without any tendency to break or rupture, which would otherwise be the case with said material if the conditioning or pretreatment were not employed.

A more specific object is to provide a method of conditioning or pretreating diaphragms made of molded or sheet polypropylene material to impart thereto properties of flexibility and resistance to fatigue not inherent in their initial molded or sheet form.

Another object is to provide a diaphragm structure with increased flexibility by mechanical manipulation thereof, by fluid pressure manipulation thereof, by mechanical and/or fluid pressure manipulation thereof, in its intended environment of use, or by mechanical and/or fluid pressure manipulation thereof in a suitable jig, or mock-up of its intended environment.

A further object is to provide a diaphragm structure with increased flexibility and thereby eleminate the necessity for employing therewith the customary diaphragm-supporting washers.

Other objects and advantages will be apparent from the following description taken in conjunction with the accompanying drawings, in which:

FIG. 1 is a vertical sectional view through a valve and molded diaphragm embodying the principles of the present invention, and which valve is normally held closed by line pressure, can be opened by operating fluid under perssure, and manually closed;

FIG. 2 is a view similar to FIG. 1, but showing a modified valve that is normally held open by line pressure, and can be closed either manually or by fluid pressure;

FIG. 8 is a vertical sectional view through a fluid pressure operated valve of a known type embodying a diaphragm made from sheet material and treated in accordance with the method of the present invention;

FIG. 9 is an enlarged fragmentary sectional view of the marginal area and the zones of flexure in the diaphragm shown in FIG. 8.

FIG. 10 is a fragmentary sectional view illustrating the application of the present diaphragm to a pump;

FIG. 11 is a vertical sectional view through a known type of automatic check valve provided with a polypropylene diaphragm; made in accordance with the present invention;

FIG. 12 is a view partly in section of a rotary type hydraulic motor employing diaphragms made in accordance with the present invention; and FIG. 13 is a view partly in section of a valve including rolling type diaphragms molded from polypropylene material.

Figure 3:
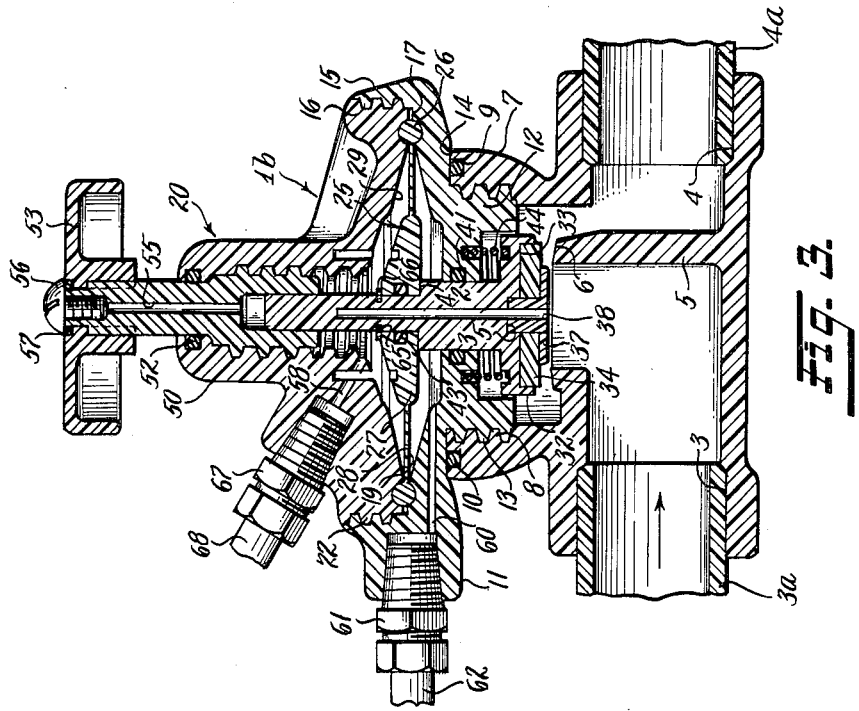
FIG. 3 is a sectional view similar to FIG. 1, but showing the valve about half open and modified so that it can be opened and closed by operating fluid under pressure, or manually closed.

Referring now to FIG. 1, the valve shown is a normally closed valve and generally identified by the numeral 1. This valve comprises a one-piece, plastic body 2 molded from "Delrin" or any other known or suitable material. The body 2 comprises a threaded inlet opening 3 and a threaded outlet opening 4. In lieu of the threads these openings may be plain (as in FIG. 2) and pipe sections 3a and 4a may be cemented thereto. A partition 5 is disposed between the inlet and outlet openings and its upper edge is inclined to form an annular seat 6. The body 2 has a cylindrical portion 7 coaxial with the seat 6 and containing an internal molded thread 8 of the stub Acme type. The cylindrical portion 7 has a groove 9 molded in the upper face thereof adapted to receive an O-ring 10.

Valve 1 also includes a circular, intermediate member 11 molded from polyvinyl chloride having a central depending boss 12. The boss 12 has external threads 13 that mate with the threads 8. The lower side of the member 11 has a smooth annular surface 14 that engages the upper face of the cylindrical portion 7 and also engages the O-ring 10 to prevent leakage between the valve body 2 and the intermediate member 11.

An annular flange 15 formed integrally with the member 11 has internal threads 16 of the stub Acme type. The flange 15 surrounds a horizontal ledge 17 containing a groove 18 that is substantially semi-circular in radial cross section. The member 11 has an inclined diaphragm supporting surface 19 disposed inwardly of the groove 18.

A molded plastic cover 20, preferably made of polyvinyl chloride, has a marginal flange 21 provided with external threads 22 that mate with the threads 16. The cover 20 also has a lower annular surface provided with a groove 24 similar to and confronting groove 18. A diaphragm 25 molded from polypropylene is disposed between the intermediate member 11 and the cover 20. The diaphragm 25 has a marginal bead 26 of substantially circular radial cross-section that is partially received in each of the grooves 18 and 24, whereby the bead is securely clamped in leak-proof relation to the intermediate member 11 and cover 20, when the cover 20 is tightened in place.

The diaphragm 25 includes a thick, hard, rigid central portion 27 that is integrally joined with the bead 26 by a relatively thin web or annular wall portion 28 of substantially uniform thickness. The cover 20 has an inclined diaphragm supporting surface 29 disposed inwardly of the groove 24. The upper surface 30 of the central portion 27 of the diaphragm 25 is generally conical and complementary to the angle of the surface 29 of the cover. The lower surface 30a of the central portion 27 is flat and disposed horizontally, as shown. The juncture of the web 28 with the periphery of the central portion 27 lies intermediate the top and bottom surfaces of said central portion.

A valve stem 31, preferably molded from the same kind of material used in the body 2, has a head 32 at its lower end containing a cavity 33 for a high carbon rubber valve disc 34. The valve stem 31 has a shallow counter bore 35 to receive the shank 36 of a plastic valve disc retainer 37, also preferably molded from the same material used in the body 2. The retainer 37 is secured in place by spinning it as it is inserted into the stem 31 to fuse it to the stem. An axial passageway 38 extends through the retainer 37 and for a substantial distance into the stem 31. For certain purposes a radial passage 39 may be drilled into the stem 31 to communicate with the upper end of the passage 38.

The valve stem 31 extends through a wall 40 in the intermediate member 11 and is engaged by an O-ring 41 mounted in said wall to prevent leakage along said stem. The central portion 27 of the diaphragm 25 has an opening 25a (FIG. 6) for the valve stem 31 and its lower surface is engageable with a shoulder 42 on the valve stem 31. Leakage between the diaphragm portion 27 and the valve stem 31 is prevented by an O-ring 43 carried in a groove 27a in said diaphragm. The upper surface 30 of the central portion 27 has an annular groove 27b (FIG. 6) formed therein that serves as a seat for the lower end of a compression spring 44 (FIG. 1) that normally tends to urge the valve disc 34 into engagement with the seat 6. The upper end of the spring 44 is received in an annular groove 45 formed in the cover 20.

The cover 20 has an internally threaded boss 50 in which a molded, externally threaded shaft or spindle 51 is rotatably mounted. An O-ring 52 is mounted in the cover 20 and forms a seal around the spindle 51. A molded knob 53 has a splined connection with the upper end of the spindle 51 to permit manual rotation thereof. The spindle 51 and knob 53 are made of the same material as is used in the body 2. A bore 54 is formed in the lower end of the spindle 51, and the upper end of the valve stem 31 is free to slide in and out of said bore. A central passage 55 in the spindle 51 serves as an air vent for the cover 20. The knob 53 is retained upon the spindle 51 by a screw 56, and a sealing ring 57, carried by the knob 53 and engaged by the head of the screw 56, forms a seal to prevent leakage from the passage 55.

The cover 20 has a passage 58, which communicates at its inner end with the chamber above the diaphragm 25 and is enlarged and threaded at its outer end to receive a plug 59. The intermediate member 11 has a passage 60, the inner end of which communicates with the chamber at the lower side of the diaphragm 25 and the outer end of which is enlarged and threaded to receive a conventional fitting 61. A tube 62 is connected with the fitting 61 and provides means through which operating fluid under pressure may be supplied to the chamber below the diaphragm 25 to effect opening of the valve, or to exhaust fluid from said chamber to allow closing of the valve, as will be explained more fully hereinafter. Flow through the tube 62 is controlled by valve means not shown.

The valve shown in FIG. 1 is normally held closed by line pressure in the inlet 3 being transmitted through the passages 38 and 39 in the valve stem 31 into the chamber above the diaphragm 25. Since the effective area of the diaphragm 25 is greater than the effective area of the valve disc 34 and stem 31, an excess of force due to fluid pressure is available to hold the valve closed. The valve disc 34 is also continuously urged toward the seat 6 by the spring 44. Therefore, in order to allow opening of the valve, fluid pressure introduced through the tube 62 equal to or in excess of line pressure will flex the diaphragm 25 upwardly, whereby displacing fluid from the chamber above the diaphragm through the valve stem passages 38 and 39. Line pressure then acting on the lower end of the stem 31 will raise said stem and thus open the valve. It will be apparent that the extent of opening of the valve may be limited as desired by suitably adjusting the spindle 51. It will also be apparent that the valve can be manually closed by turning the spindle to move the stem 31 toward the seat 6. Such manual closing can be effected regardless of the pressure in the chamber below the diaphragm 25 since the stem 31 is slidable relative to said diaphragm.

The valve 1a shown in FIG. 2 is similar to that shown in FIG. 1, except that the O-ring 41 and the radial passage 39 have been omitted, and the positions of the plug 59 and the fitting 61 have been reversed. That is to say, the plug 59 is mounted in the intermediate member 15, and the fitting 61 is mounted in the cover 20. With these changes, the valve is converted to a normally open valve wherein, when the chamber above the diaphragm 25 is vented, line pressure need only exceed the force of the spring 44 and the weight of the valve stem in order to maintain the valve open. The valve 1a can be either closed manually by rotating the spindle 51, or by introducing operating fluid under pressure through the tube 62 into the chamber above the diaphragm 25. The valve 1a can be positively held in closed position by screwing down the spindle 51.

FIG. 3 illustrates a power operated valve 1b including the same basic elements shown in FIG. 1, but modified to the extent that the stem is provided with a groove 65 located at a predetermined distance above the shoulder 42, corresponding to the axial thickness of the central portion 27 of the diaphragm 25. A clip 66 is mounted in the groove 65 to retain the central portion 27 of the diaphragm against the shoulder 42 so that the stem 31 is now locked to the diaphragm 25. The valve 1b is further modified to the extent that the plug 59 is omitted and a conventional fitting 67 is substituted therefor. A tube 68 similar to the tube 62 is connected with the fitting 67. Moreover, the radial passage 39 is omitted and the location of the spring 44 is shifted to a position between the head 32 of the valve stem 31 and the wall 40 of the intermediate member 11.

The spring 44 will normally tend to urge the valve stem 31 toward closed position. The action of the spring 44 may be supplemented by operating fluid under pressure introduced into the chamber above the diaphragm 25 through tube 68. Positive opening of the valve 1b can be effected by venting the chamber above the diaphragm 25 through tube 68, and supplying operating fluid under adequate pressure through the tube 62 to the chamber at the lower side of the diaphragm. Moreover, since the pressure in the chambers above and below the diaphragm 25 can be controlled, the valve stem 31 may be retained in any desired position of adjustment to control the rate of flow through the valve. The valve 1b can be manually closed by venting the operating fluid from the chamber at the lower side of the diaphragm 25 through the tube 62, and rotating the spindle 51 until the valve disc 34 is seated.

Figure 4:
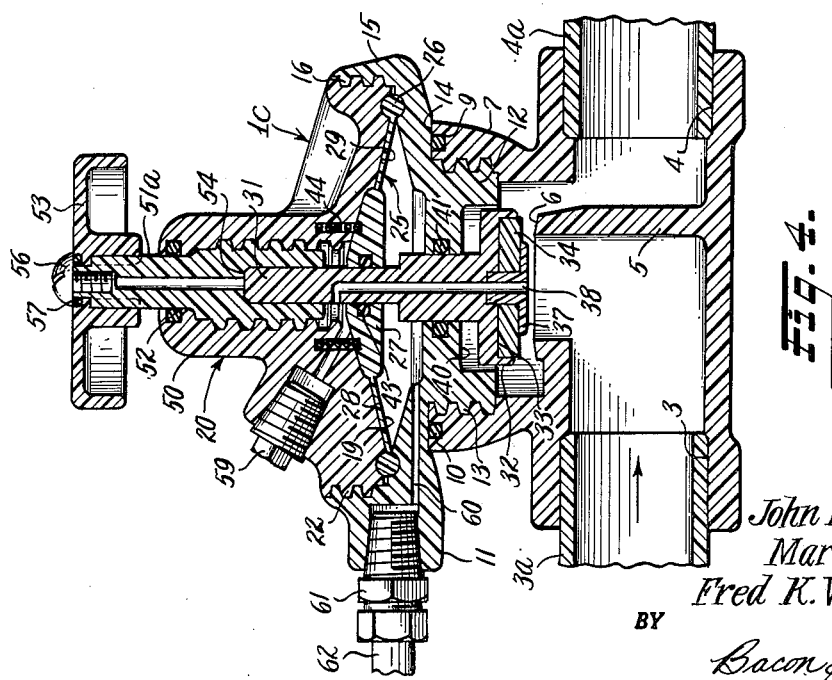
FIG. 4 is a vertical sectional view through a valve similar to that shown in FIG. 1, but wherein the valve is modified to restrict the maximum travel of the valve stem to about 50% open position.

FIG. 4 illustrates a valve 1c similar to that shown in FIG. 1 but wherein a spindle 51a is modified so that when it is backed out as far as the threads in the boss 50 will permit, the bottom of the bore 54 is located in such position that it will allow the valve stem 31 to be moved only to approximately the half-open or 50% open position of the valve. In this way, the maximum flow through the valve 1c can be limited to 50% of the full capacity of the valve. It will be noted that the groove 65 and the clip 66 have been omitted from the valve stem 31 so that the diaphragm 25 can slide along said valve stem and fully seat against the inner surface 29 of the cover 20. Otherwise, the valve 1c will operate in the manner as the valve shown in FIG. 1.

Figure 5:
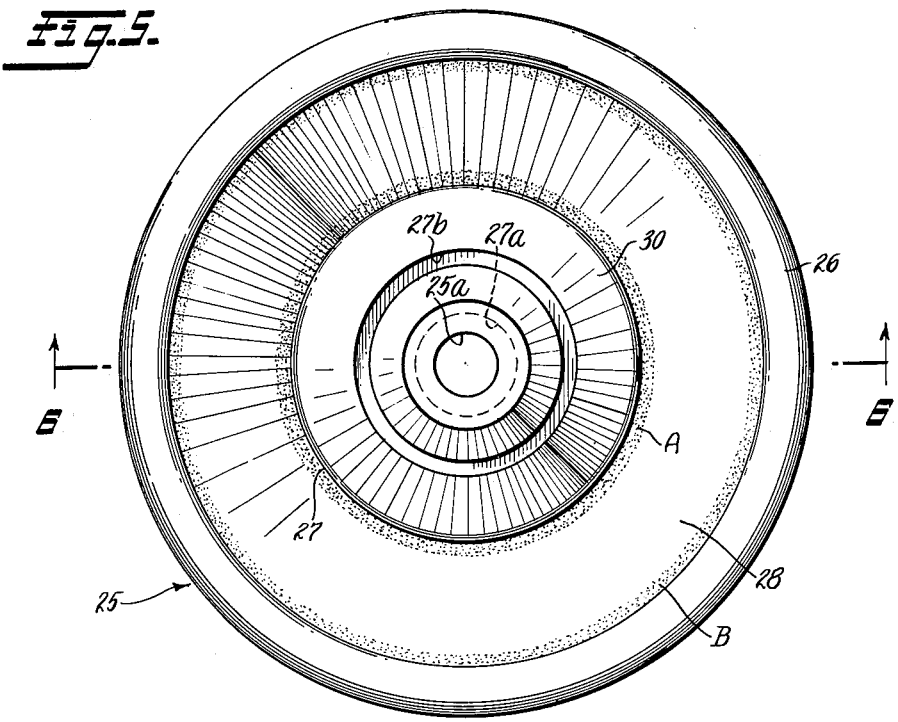
FIG. 5 is a plan view of the molded diaphragm employed in the valves shown in FIGS. 1–4, inclusive.
Figure 6:
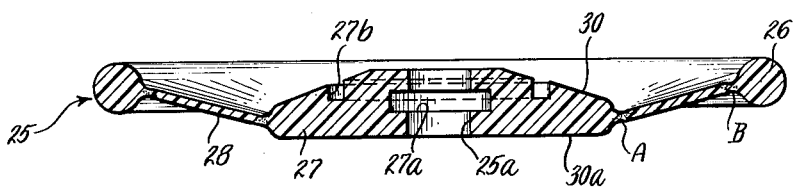
FIG. 6 is a sectional view through the diaphragm taken on the line 6—6 of FIG. 5.

The diaphragm 25 illustrated in FIGS. 1-4 is shown on an enlarged scale in FIGS. 5 and 6. All of the valve parts shown in FIG. 1 with the exception of the spring 44, the screw 56, the plug 59 and the fitting 61 may be made by molding the same from any suitable plastic materials, or certain of the parts, such as the body 2, intermediate member 11, and cover 20, may be made of metal, if desired. The various sealing O-rings may be made of neoprene or any other conventional material. The diaphragm 25, however, is preferably made from a plastic material well known as polypropylene. This material is the lightest of all plastics and has a specific gravity of about 0.905. Other general properties are that the material is relatively inexpensive, is chemically resistant to many acids and solvents and exotic fuels, is tough, rigid (except in very thin films) and resistant to distortion even at high temperatures of about 300° F. Its melting point is about 330° F., and its Rockwell hardness on the C scale is about 95.

Diaphragms according to the present invention may be molded of polypropylene or cut from a sheet of such material. In either event such diaphragms are unsuitable for present purposes unless manipulated or pretreated in a certain manner to render them pliable prior to being placed into service. As has been indicated above, polypropylene has the general property of being rigid, although it will be understood that rigidity will vary with the thickness of the material. It has been discovered that if polypropylene material having any appreciable stiffness or rigidity has a bending force suddenly applied thereto, the material will crack, or break by snapping under the force; whereas, the same material if subjected to a slow and gentle, back and forth, bending action will have its molecules rearranged in the zone of flexure so that after the material has been gently reversely flexed through three to six or more bending cycles, an increased flexibility and increased tensile strength is imparted to the material at the zone of flexure. The material is rendered pliable at such zones so that thereafter it can be flexed an infinite number of times without fatigue failure. In experiments performed with polypropylene sheet diaphragms of a thickness of 0.010 inch fitted in 2" and 2½" valves, with proper conditioning or pretreatment as described above, the diaphragms withstood in excess of 44,000 bending cycles (each cycle consisting of bending the material in one direction and then bending it in the opposite direction) without failure.

In a diaphragm of the type illustrated in FIGS. 5 and 6, the zones of flexure will take the general form of rings, with one ring A being located adjacent the juncture of the annular portion 28 of the diaphragm 25 with the central portion 27 and another ring indicated at B adjacent the marginal bead 26.

Polypropylene without any color pigment added has a watered-milk or off-white appearance. The flexing of the material as described above produces a rearrangement of the molecules that is visible because of a change in color of the material at the zones of flexure. That is to say, the zone of flexure assumes a whiter appearance, suggesting an increase in density, and this has been indicated by the stipling in FIGS. 5 and 6. The flexing action also produces the phenomena of causing the material to become slightly thinner at the zones of flexure. Although contrary to what would be expected, the tensile strength of the material at the zones of flexure was not reduced but increased manyfold, i.e., from a tensile strength of about 5,000 p.s.i. to about 70,000 p.s.i. This increase in strength accounts for the virtually indefatigable character of the material at the zones of flexure.

It is understood and believed that the molecules in polypropylene have an ordinary regularity of arrangement in contrast with the branched or random arrangement found in other plastic materials which permits close packing of the molecules and leads to high crystallinity that gives a desirable strength and stiffness characteristic. These molecules are long compared to their diameter. This permits the molecules to be lined up or oriented during flexing to develop high strength. The molecules are stronger lengthwise than crosswise, wherefore the oriented areas of polypropylene have imparted thereto a tensile strength of about 70,000 p.s.i. as compared to about 5,000 p.s.i. when unoriented.

Diaphragms embodying the principles of the present invention may be conditioned or pretreated to produce zones of increased flexibility by mounting the same in the devices in which they are intended to be used, and then gently and slowly moving the central portion of the diaphragm axially relative to the marginal portion of the diaphragm, or vice versa. It has been found that relative slow movement of the portions of the diaphragms to their maximum limits of travel for about three to six cycles will effect the desired orientation of the molecules. The relative movement of the parts of the diaphragm may be effected by slowly applying low fluid pressure alternately to opposite sides of the diaphragm, the pressure applied should be sufficient to flex the diaphragm to its extremes, and can be substantially less than the pressure that would be applied to the diaphragm during its normal use. After the diaphragm has been preconditioned as described above it may be subjected to full pressure and flexed at its normal rate.

It will also be understood that the polypropylene diaphragms may be conditioned or pretreated by mechanically bending the same, as by the use of a jig (not shown) simulating the elements of a valve, or other device in which the diaphragm is to be used. The jig method has the advantage of permitting visual inspection of the diaphragm prior to its final installation in the valve or other device. Obviously, the jig can be constructed so that fluid pressure can be used to supplement the mechanical bending of the diaphragm material.

Figure 7:
FIG. 7 is a fragmentary view of a modified form of molded diaphragm.

FIG. 7 illustrates a diaphragm 25e similar to that shown in FIG. 6 but wherein the marginal bead has been omitted. This type of diaphragm can be pretreated to produce zones of increased flexibility at C and D in the same manner described with respect to the diaphragm shown in FIGS. 5 and 6.

FIGS. 8 to 13, inclusive, illustrate devices employing different diaphragm configurations, and it will be understood that these have been disclosed as illustrative of diaphragms that can be preconditioned as above described to obtain the advantages of using polypropylene diaphragms in such devices.

FIG. 8 is a vertical sectional view through a hydraulically operated valve of known construction wherein a diaphragm 75 of sheet polypropylene has been disclosed. The diaphragm 75 is clamped at its outer margin between flanges 76 and 77. The central portion of the diaphragm is clamped between supporting plates 78 and 79 mounted upon a valve stem 80. Pre-conditioning of the diaphragm 75 in the manner described hereinabove results in producing concentric ring-like zones of increased flexibility at 81 and 82, respectively, zone 81 being located adjacent the central portion of the diaphragm disposed between the supporting plates 78 and 79, and zone 82 being disposed adjacent the clamped marginal portion of the diaphragm.

FIG. 9 diagrammatically illustrates on an enlarged scale the phenomenon of thinning of the polypropylene material at the zones 81 and 82 in which the molecules have been rearranged to increase the flexibility of the diaphragm material.

FIG. 10 illustrates the application of the principles of the present invention to a diaphragm 83 employed in a diaphragm type of pump 84. As is shown, the diaphragm 83 has a rigid central portion 85 surrounded by a relatively thin portion 86 integrally joined with a marginal portion 87 that is clamped between the pump housing parts 88 and 89. The central portion 85 of the diaphragm is aligned with a cylinder 90 having a bore containing a plunger 91. The cylinder 90 contains ports 92 that permit oil or other liquid in the housing part 88 to enter the cylinder when the plunger 91 is retracted to a point to the left of the ports. The plunger 91 is shown as applying force to liquid confined between it and the adjacent side of the diaphragm 83, causing the diaphragm to flex toward the right against the action of a return spring 87a. The spring 87a is at the lower end of a column 89a containing liquid to which impulses are to be imparted to effect a pumping action in cooperation with means not shown, and which is immaterial to the present invention. In any event, it will be noted that diaphragm 83 is characterized by concentric zones of flexibility indicated at 93 and 94 and produced by employing the principles of the preconditioning methods described hereinabove.

FIG. 11 illustrates an automatic check valve of known type, the details of which are not pertinent to the present invention other than to illustrate another environment in which a polypropylene diaphragm 95 reconditioned in accordance with the present invention may be employed. As is here shown, the diaphragm 95 includes a thick, central rigid portion 96 that is adapted to engage a seat 97. A marginal portion 98 of the diaphragm is clamped between a valve body 99 and a cover 100. An intermediate annular portion 101 of the diaphragm is of substantially uniform thickness and interconnects the central portion 96 and the marginal portion 98. A spring 102 urges the central portion of the diaphragm 95 towards the seat 97. Zones of increased flexibility produced in the diaphragm by manipulation as described hereinabove are indicated at 103 and 104.

An important advantage of the use of a polypropylene diaphragm in a valve of the type shown in FIG. 11 and wherein the diaphragm 95 directly engages the seat 97, is that the polypropylene material at the central portion 96, is sufficiently hard and rigid that it will not "cold flow," nor will it tend to embed itself and stick within the valve seat, as occurs with rubber and similar diaphragm materials.

FIG. 12 illustrates a further environment in which the present polypropylene diaphragm may be advantageously used. Thus, the numeral 105 generally identifies a known type of hydraulic motor provided with polypropylene diaphragms 106 pretreated in accordance with the present invention. The diaphragms 106 are shown clamped at an outer marginal portion 107 between the body of the motor 108 and a cover 109. Pistons 110 are slidably mounted in bores 111 in the body 108. The central portion 112 of the diaphragms 106 engage the head of the pistons 110, which are shown as convex. A chamber 113 in each cover 109 has operating fluid under pressure supplied thereto in appropriate sequence to effect successive inward radial movement of the pistons 110, with the result that rotation of the motor shaft 114 is effected as operating fluid is supplied to and exhausted from the full series of chambers 113 comprising the motor. Pretreatment of the diaphragms 106 will develop zones of increased flexure indicated at 115 and 116, respectively.

FIG. 13 illustrates a known pressure differential relief valve 120 comprising body members 121, 122 and 123. A polypropylene diaphragm 124 has a marginal bead 125 clamped between the sections 121 and 122. A central portion 126 of the diaphragm 124 is clamped between a piston element 127 and a supporting plate 128. The diaphragm 124 also includes an intermediate portion 129 that is generally U-shaped and disposed between the bead 125 and the central portion 126. A similar diaphragm 130 is clamped between the body members 122 and 123 and connected with a similar piston 131. The pistons 127 and 131 are connected with a rod or stem 132. The body section 121 has a transverse wall 133 in which a spacer sleeve 134 is slidably mounted and carried by the rod 132. The wall 133 cooperates with the diaphragm 124 to provide a pressure chamber 135 and cooperates with the diaphragm 130 to provide a pressure chamber 136. Operating fluid under pressure is admitted to and exhausted from the chamber 135 through a fitting 137. Fitting 138 serves the same function with respect to the chamber 136.

The diaphragms 124 and 130 are of the so-called "rolling" type, in that the U-shaped portion 129 is subjected to a rolling action as the rod 132 is reciprocated by pressure effective in one or the other of the chambers 135 and 136.

Pretreatment of the diaphragms 124 and 130 when made of polypropylene material can be effected to provide flexibility in the U-shaped portion 129 by clamping the diaphragms in the device 120 or in a mock-up similar thereto, and slowly reciprocating the stem 132 until the molecules in the U-shaped portion 129 of the diaphragm have been rearranged by a sort of kneading action to render said portion flexible. Accordingly, the zone of flexure in the diaphragms 124 and 130 will occupy substantially the entire U-shaped portion of the diaphragms, as indicated by the stipling in FIG. 13. The pretreatment of the diaphragms 124 and 130 may be effected manually or by otherwise moving the rod 132 or comparable element in a mock-up, or effecting slow movement of the rod by controlling the rate of supply and exhaust of operating fluid to the pressure chambers 135 and 136. In either event, the movement must be slow, and not abrupt, in order to properly condition the polypropylene diaphragm material without damage.

It will be understood that the methods of conditioning or pretreating polypropylene diaphragm material disclosed herein may be applied to other plastic materials exhibiting like properties. It will also be understood that modifications may be made in the details of the diaphragms and particularly in the configuration of the central rigid portion thereof in designing the same to eliminate the presence of diaphragm supporting plates in various types of valve structures.

We claim:

1. The method of conditioning or pretreating a polypropylene diaphragm which will snap or break if bent suddenly or abruptly to prevent breaking and to render it more flexible, said diaphragm having an annular region to which fluid pressure is to be applied in use and portions disposed radially inwardly and outwardly of said annular region, comprising: mounting the diaphragm in the device in which it is to be used; maintaining stationary the portion of the diaphragm disposed outwardly of said annular region, gently moving the portion of the diaphragm disposed inwardly of said annular region back and forth beyond both sides of a plane passing through the stationary portion at a slow rate insufficient to cause the aforesaid snapping or breaking of said material, effecting such slow and gentle back and forth movement by alternately subjecting the opposite sides of the annular region to a fluid pressure substantially less than the pressure to which the diaphragm will be subjected in normal use, to establish a kneading action to produce at least one annular zone of flexure in said annular region; and repeating said gentle and slow back and forth movement by continuing the alternate low application of pressure until the molecules in the annular zone of flexure in said annular region have, through said kneading action, been rearranged and oriented to impart increased flexibility to said diaphragm.

2. The method of conditioning or pretreating a polypropylene diaphragm which will snap or break if bent suddenly or abruptly to prevent breaking and to render it more flexible, comprising: mounting the diaphragm in the device in which it is to be used; gently and slowly applying to said diaphragm a fluid pressure force substantially less than that to which it would be subjected in normal use to effect slow and gentle movement of said diaphragm back and forth between positions corresponding to its extreme positions of movement in said device at a rate insufficient to cause the aforesaid snapping or breaking of said material, to establish a kneading action to produce at least one annular zone of flexure in said diaphragm; and repeating said back and forth movement until the molecules in said annular zone of flexure have, through said kneading action, been rearranged and and oriented to impart increased flexibility to said diaphragm.

References Cited by the Examiner

UNITED STATES PATENTS

| | | | |
|---|---|---|---|
| 2,638,127 | 5/1953 | Griswold | 137—793 |
| 2,746,087 | 5/1956 | Dolezal | 18—48 |
| 2,775,983 | 1/1957 | Johnson | 137—793 |
| 2,838,269 | 6/1958 | Hunter | 251—61 |
| 2,989,282 | 6/1961 | White | 251—61 |
| 3,019,486 | 2/1962 | Stinson | 18—48 |

ROBERT F. WHITE, *Primary Examiner.*

WILLIAM F. O'DEA, ALEXANDER H. BRODMERKEL, *Examiners.*